United States Patent Office 3,154,526
Patented Oct. 27, 1964

3,154,526
PROCESS FOR PREPARING RESINOUS COMPOSITIONS FROM ALKYLENE SULFATES AND ALKYLENE OXIDES
Donald L. Klass, Barrington, and John E. King, Evanston, Ill., assignors to The Pure Oil Company, Chicago, Ill., a corporation of Ohio
No Drawing. Filed May 1, 1961, Ser. No. 106,468
19 Claims. (Cl. 260—79.3)

This invention relates to novel products having resinous properties prepared from organic epoxides and cyclic sulfates by reaction with complexed sulfur trioxide followed by reaction with certain nitrogen compounds, or prepared by reacting an organic epoxide with sulfamic acid.

In a copending application, Serial No. 46,362, filed August 1, 1960, by D. L. Klass and V. Brozowski, there is described a novel class of organic inner salts prepared by the reaction of an organic epoxide with a complex of sulfur trioxide and a tertiary amine, or by sequential treatment of an epoxide with a sulfonating agent, such as a dioxane-sulfur-trioxide complex, and then with a tertiary amine. These compounds are water soluble and exhibit surfactant and detergent qualities in addition to being insecticidal.

In accordance with this invention, we have discovered that a new class of resinous compounds, containing carbon, hydrogen, nitrogen, sulfur and oxygen, is formed by reacting an alkylene sulfate, prepared previously by any known methods, or, preferably, prepared in situ by the reaction of an organic epoxide with complexed sulfur trioxide, with ammonia, a primary aliphatic amine, or a secondary aliphatic amine. Another aspect of this invention is the discovery that another new class of compounds is prepared by the reaction of organic epoxides and sulfamic acid, same being low-molecular-weight copolymers of the epoxide and sulfamic acid. The products of the two embodiments of this invention differ from the products of said copending application in that they are resinous in nature. Though one product prepared by the method of this invention hereinafter further defined, has surface-active properties, it is also a film-former. Some of the products of this invention may be used as protective coatings, as ingredients in coating compositions and the like.

Accordingly, it is a primary object of this invention to provide a novel class of compounds prepared by the reaction of organic epoxides with complexed sulfur trioxide, followed by reaction with certain nitrogen compounds.

Another object of this invention is to provide a new process for the preparation of resinous products by the reaction of organic epoxides with complexed sulfur trioxide followed by reaction with nitrogen compounds.

Another object of this invention is to provide a new process for the preparation of compounds by the reaction of organic epoxides with sulfamic acid.

Another object of this invention is to provide a new class of resins prepared by the reaction of an alkylene sulfate with ammonia, a primary aliphatic amine, or a secondary aliphatic amine. The alkylene sulfate for the reaction is prepared by known methods, or, preferably, prepared in situ by the reaction of an organic epoxide with complexed sulfur trioxide.

Other objects of this invention will be described or become apparent as the specification proceeds.

In accordance with our invention the organic epoxide has the formula,

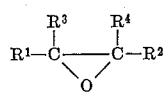

wherein $R^1$, $R^2$, $R^3$ and $R^4$ are substituents of the group consisting of hydrogen, hydrocarbon radicals and other radicals, including as non-limiting examples alkyl, aryl, alkaryl, aralkyl, cycloparaffinic, naphthyl, anthryl, phenanthryl, acenaphthenyl, naphthacyl, chrysyl, pyryl, benzohydryl, triphenylyl, methyl, ethyl, propyl, isopropyl, butyl, isobutyl, t-butyl, amyl, isoamyl, hexyl, isohexyl, heptyl, octyl, nonyl, decyl, undecyl, dodecyl, tridecyl, tetradecyl, pentadecyl, hexadecyl, heptadecyl, octadecyl, nonadecyl, and eicosyl, phenyl, tolyl, ethylphenyl, propylphenyl, cyclopentyl, cyclohexyl, benzyl, biphenyl, bonyl, camphanyl, carbacryl, cinnamyl, cuminyl, cumyl, cymyl, duryl, fenchanyl, phenethyl, phenpropyl, and phenbutyl, and including halosubstituted derivatives thereof as further illustrated by the following specific examples. The hydrocarbon substituent groups $R^1$, $R^2$, $R^3$ and $R^4$ may contain from 1 to 25 carbon atoms, and preferably 1 to 5 carbon atoms. Species of organic epoxides, which are oxirane compounds having the ring oxygen atom attached to two adjacent carbon atoms, include, Ethylene oxide
Propylene oxide
1,2-butylene oxide
2,3-butylene oxide
1,2-pentene oxide
2,3-pentene oxide
1,2-hexene oxide
2,3-hexene oxide
3,4-hexene oxide
1,2-heptene oxide
2,3-heptene oxide
3,4-heptene oxide
1,2-octene oxide
2,3-octene oxide
3,4-octene oxide
1,2-nonene oxide
2,3-nonene oxide
3,4-nonene oxide
4,5-nonene oxide
1,2-decene oxide
2,3-decene oxide
3,4-decene oxide
1,2-undecene oxide
1,2-dodecene oxide
Phenyl ethylene oxide
3-phenyl 1,2-propylene oxide
Naphthyl ethylene oxide
1-Methyl phenyl ethylene oxide
3-cyclohexyl propylene oxide
3-chloro-phenyl ethylene oxide
3-cyclohexyl propylene oxide
3-phenethyl 1,2-butylene oxide
4-tolyl 1,2-butylene oxide
5-cuminyl 1,2-pentene oxide
1,2-dibutyl ethylene oxide
1,2-di-amyl ethylene oxide
1,2,3-trimethyl ethylene oxide
1,2,3,4-tetramethyl ethylene oxide In addition to dioxane-sulfur-trioxide complex, other complexes such as dioxane-bis-sulfur-trioxide, thioxane-sulfur-trioxide, and thioxane-bis-sulfur-trioxide can be used. Mixtures of such complexes are also contemplated.

In general, the objectives of this invention are carried out in one of the embodiments thereof by reacting an alkylene sulfate with a nitrogen compound of the group consisting of ammonia and aliphatic derivatives of ammonia, i.e., aliphatic amines compounds having a replaceable hydrogen atom attached to a nitrogen atom, to include principally aliphatic primary and secondary amines having one or more nitrogen atoms and excluding tertiary amines, hydroxy amines, alicyclic amines, haloamines and acetylenic amines.

The amines used as reactants in accordance with this invention have the general formula,

and wherein $R^5$ and $R^6$ represent aliphatic radicals containing from 1 to 20 carbon atoms. In the above formula where $R^5$ is hydrogen, $R^6$ may be an alkyl radical to form the series of amines including methylamine, ethylamine, propylamine, isopropylamine, butylamine, amylamine, hexylamine, heptylamine, octylamine, nonylamine, decylamine, dodecylamine, tridecylamine, tetradecylamine, pentadecylamine, hexadecylamine, heptadecylamine, octadecylamine, nonadecylamine and eicosylamine, and their homologs and analogs.

Secondary amines include dialkylamines containing similar or different alkyl groups, such as dimethylamine, diethylamine, dipropylamine, diisopropylamine, dibutylamine, diamylamine, dihexylamine, diheptylamine, dioctylamine, dinonylamine, ethylamylamine, methylethylamine, methylpropylamine, methylisopropylamine, methylbutylamine, methylamylamine, methylhexylamine, methylheptylamine, methyloctylamine, methylnonylamine, methyldecylamine, methylundecylamine, methyldodecylamine, methyltridecylamine, methyltetradecylamine, methylpentadecylamine, methylhexadecylamine, methylheptadecylamine, methyloctadecylamine, methylnonadecylamine, ethylpropylamine, ethylisopropylamine, and ethyl-t-butylamine, as well as their homologs and analogs containing a total of about 40 carbon atoms. It is preferred, when using dialkylamines as reactants, that the alkyl substituents be similar alkyl groups, each containing less than about 10 carbon atoms. Where $R^5$ and $R^6$ are hydrogen, ammonia is the amine reactant.

The process and products of this invention also relate to the use of aliphatic diamines, aliphatic triamines, olefinic amines and amino ethers of aliphatic nature. This subgroup of amine reactants may include ethylenediamine, trimethylene diamines, tetramethylamine diamine, pentamethylene diamine, 1,2-diaminopropane, N-methylethylenediamine, 1,2-butylenediamine, 2,3-diaminobutane, isobutylenediamine, N-monoethylethylenediamine, β-dimethylaminoethylamine, N,N' - dimethylethylenediamine, 2-methyl-1,2-diaminobutane, 2 - methyl-1,4-diaminobutane, 2,2 - dimethyl - 1,3 - propanediamine, 1-dimethylamino-2-aminopropane, hexamethylenediamine, 1 - ethylamino-2-aminobutane, 2-methyl-2-methylamino-1-aminobutane, 3-ethylamino-2-methyl-2-aminopropane, β-diethylaminoethylamine, 1-diethylamino - 2 - aminopropane, 1 - dimethylaminopropylamine, 1-diethyl - 2 - aminobutane, 1-diethylamino - 3 - methylaminopropane, tetraethylmethylenediamine, decamethylenediamine, and such higher diamines as spermidin and spermin. Triamines of the formula $$H_2N(C_2H_2NH)_xH$$

wherein $x$ has a value of 2 to 6 are included.

The olefinic amines that may be used are allylamine, methallylamine, allylmethylamine, 1-amino - 4 - pentene, allyldimethylamine, 1-ethylamino-3-butene, diallylamine, 1-dimethyamino-4-pentene, and allyldiethylamine, along with such amino ethers as γ-methoxy-n-propylamine, γ-ethoxy-n-propylamine, β-methoxyisobutylamine, γ-methoxyisobutylamine, β-ethoxy-n-butylamine, diethylaminomethylmethylether, and 1-diethylamino - 5 - methoxypentane. The use of mixtures of amines is within the scope of this invention.

In order to illustrate the invention, the following non-limiting examples are given:

*Example I*

Dioxane-sulfur-trioxide complex was prepared from 1 gram-mole of sulfur trioxide and 210 ml. of dioxane in 300 ml. of ethylene dichloride. Then one gram-mole of ethylene oxide was bubbled into the mixture over a period of 4 hours and 15 minutes. The resulting solution was clear, without any solid complex remaining, indicating that all of the sulfur trioxide had reacted with the ethylene oxide to form ethylene sulfate.

In accordance with this invention, gaseous ammonia was added through a filter strip to a 200-ml. portion of the solution until no more ammonia was absorbed; this took about 1 hour and 50 minutes. During the addition of ammonia, the reaction mixture became viscous, and then the product separated as a taffy-like resinous substance.

The product was washed with ethylene dichloride and then with ether, and was dried in vacuo to obtain the product as a yellow-white resinous mass weighing 66.1 g.

This product was slightly soluble in cold water, sparingly soluble in hot water, and soluble in hot aqueous acid. A positive test for sulfate ion was obtained when an aqueous acid solution of the product was warmed, indicating the presence of bonded sulfate groups. Aqueous solutions of the product were almost neutral. Hydrolysis with aqueous acid gave a reaction mixture which, according to a sodium nitroferricyanide test, contained no ethanolamine, indicating that the ammonia molecule had not attacked the carbon atoms. The elemental analysis of the product was: carbon, 26.9%; hydrogen, 7.64%; nitrogen, 5.5%; and sulfur, 15.5%. Infrared analysis confirmed the presence of the sulfate group.

*Example II*

A similar reaction was carried out using diethylamine instead of ammonia. The reaction when the liquid diethylamine was added was vigorous and exothermic. The properties and infrared spectrum of the product were similar to those of Example I. No N,N-diethyl-ethanolamine was detected when the product was hydrolyzed.

*Example III*

A reaction similar to Example I was run using propylene oxide instead of ethylene oxide. The product was a tan, viscous mass, indicating that propylene oxide and ethylene oxide react similarly with dioxane-sulfur-trioxide complex, followed by reaction with ammonia.

To illustrate the other aspect of the invention, the following non-limiting examples are given:

*Example IV*

Propylene oxide (1 gram-mole) in 250 ml. of ethylene dichloride was treated with 1 gram-mole of sulfamic acid under refluxing conditions and with vigorous stirring. Initially the reflux temperature was 63° C., but as the reaction progressed, the reflux temperature gradually increased to 84° C., the boiling point of the solvent. After the mixture had been refluxed for 14 hours, with a final temperature of 84° C., a brown heavy syrup had formed.

The supernatant liquid was decanted from the brown viscous phase, and the syrup was washed several times with ethylene dichloride. Then the decanted supernatant liquid and the washings were combined and evaporated in vacuo, leaving an oily liquid as one product (Product I). This product had a resinous odor, gave a negative barium chloride test for sulfate ion, was almost neutral in water, and had a molecular weight of about 280. Its elemental analysis was: carbon 44.7%; hydrogen, 9.0%; nitrogen, 4.6%; and sulfur, 10.8%. Infrared analysis indicated the presence of sulfonic acid groups.

The residue from the ethylene dichloride washing was a hard, brown, glassy cake. A 38.0-g. aliquot of the material was fractionated from Formula 30 alcohol to obtain the following fractions:

| Fraction | Weight, g. | State (at room temp.) |
|---|---|---|
| A | 11.3 | Solid. |
| B | 0.8 | Solid. |
| C | 0.7 | Solid. |
| D | 24.8 | Oil. |

All of the fractions were acidic in water.

Fraction D had an infrared spectrum similar to that of Product I and also contained sulfonate groups, but it was more acidic. Both Product I and Fraction D therefrom appeared to be copolymers of sulfamic acid and propylene oxide. The elemental analysis of Fraction D was: carbon, 35.5%; hydrogen, 7.8%; nitrogen, 7.4%; and sulfur, 19.6%. Fractions A, B and C were identified as mixtures of sulfamic acid and ammonium sulfate by infrared analysis.

*Example V*

Dodecene oxide (30 g.) in 150 ml. of ethylene dichloride solvent was mixed and refluxed with 15.9 g. of sulfamic acid for 11 hours. The solid product which formed was recovered by filtration and was washed with ether and dried. It had a melting point of 85°–89° C., and gave a positive barium chloride test in acid.

The washings and the filtrate were combined and evaporated to remove the solvent. The residue was an orange oil which was found by means of infrared analysis to contain sulfonate groups. Treatment of this oil with aqueous 20% sodium hydroxide gave a white solid which had surface-active and foaming properties.

*Example VI*

A 20.0-g. portion of 2,3-pentene oxide is reacted with dioxane-sulfur-trioxide complex at 50° C., followed by reaction with a 20-g. portion of hexylamine. From this reaction there is produced a product which corresponds to the reaction of Example II.

*Example VII*

A 20.0-g. portion of 2,3-hexene oxide is reacted with 10 gms. of sulfamic acid in a hexane solution at 69° C. for four hours under reflux to form a brown, heavy, syrupy product which is further purified in accordance with Example IV to form a hard, brown, glassy product in accordance with this invention.

*Example VIII*

1,2-butylene oxide (30 g.) in 200 ml. of 1-chloroheptane solvent is mixed and refluxed at 160° C. for 2 hours with 30 g. of sulfamic acid. A solid product is obtained and recovered by filtration which has surface-active and foaming properties.

The reaction is readily carried out and it is only necessary to bring equimolar quantities of the organic epoxide and sulfamic acid, or complexed sulfur trioxide followed by ammonia or the amine, together at temperatures ranging from about 0° to 60° C., or under reflux conditions. Where the alkylene sulfate is the starting material, the reaction is readily carried out at room temperature or less merely by adding the ammonia or amine to a solution of alkyl sulfate. Mixtures of ammonia and a primary aliphatic amine or a secondary aliphatic amine, or both, or mixtures of primary and secondary aliphatic amines can be used. When sulfamic acid is reacted with an epoxide, it is only necessary to reflux the reactants together for a sufficient time to complete the reaction. Preferably this reaction is carried out by mixing the reactants in a reaction solvent, such as ethylene dichloride, toluene, hexane, cleaning naphthas, etc., particularly where the reactants are immiscible, or are solids, and then refluxing the mixture for a sufficient time to obtain completion of the reaction. However, the solvent may be omitted, if desired, and the reactants mixed and heated together.

The cyclic sulfates, used as starting materials for one embodiment of this invention, are prepared by the reaction of dioxane-sulfur-trioxide complex with an epoxide, as herein identified, and have the general formula,

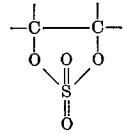

where the valences of the carbon atoms are connected to hydrogen or hydrocarbon radicals (or substituted hydrocarbon radicals, including aromatic and cyclic radicals as herein-before-defined in relation to the organic epoxides). Cyclic sulfates of this type include ethylene sulfate, propylene sulfate, butylene sulfate, pentylene sulfate, dodecene sulfate, undodecene sulfate, octadecene sulfate, styrene sulfate, cyclohexene sulfate, etc. These compounds react with ammonia, a primary aliphatic amine, or a secondary aliphatic amine, or the other amines as herein defined, to give the novel products of this invention.

The invention has been described by reference to several preferred embodiments, but it is to be understood that this process is generally operative for effecting the reaction of any suitable sulfur trioxide complex, or any organic epoxide to give the cyclic sulfate which is then reacted with ammonia, a primary aliphatic amine, or a secondary aliphatic amine. Where the reactants are liquid, or miscible with one another, no solvent is required. Where the reactants are immiscible, or are both solids, any inert solvent may be used to carry out the process of this invention. Lower-molecular-weight saturated hydrocarbons, fractions predominating in such hydrocarbons, and halogenated, particularly chlorinated, derivatives thereof are the preferred inert reaction media because these solvents have no influence on the reaction except to obtain intimate dispersion or solution of the reactants. Accordingly, any cyclic sulfate or substituted cyclic sulfate may be used with ammonia, or any primary or secondary aliphatic amine, as long as the reactants do not contain substituents which would impede, hinder, or stop the reaction.

The products formed by the reaction of epoxides and sulfamic acid, according to one embodiment of this invention, are (in free acid form) useful as surfactants, film-forming compositions, and for other purposes. Various salts may be formed as derivatives of these compounds to form useful surfactants and dispersing agents for use in cleaning compositions. For these purposes, the reaction products of the epoxides and sulfamic acid, which generally exhibit the properties of compounds having an $SO_3H$ group at one end of the molecule linked by an ether chain to an amino or substituted-amino group at the other end, are reacted with a base such as an alkali metal hydroxide or oxide, alkaline earth metal hydroxide or oxide, i.e., sodium hydroxide, potassium hydroxide, barium hydroxide, calcium oxide, etc., to form the salt. The unsubstituted portion of the amino group may be transformed into a complex with an acid or onium compound to form polyfunctional detergents.

The resinous products, formed as a result of the reaction of an alkylene sulfate and ammonia or the amines disclosed herein are useful as coating compositions, i.e., for use in paints, varnishes, polishes, and molding compositions. The tough, semi-elastic and resilient properties of the products of this aspect of the invention make them eminently suited for these purposes. Without limiting the invention, these products appear to be chains having a $OSO_3-$ at one end, and an amino or substituted amino group at the other end with ether and $SO_3$ groups in the chain.

The embodiments of the invention in which an exclusive property or privilege is claimed are defined as follows:

1. The process of preparing resinous compositions which consists in reacting substantially equimolar amounts of an alkylene sulfate of 2 to 102 carbon atoms containing only hydrogen, hydrocarbon and halo substituents with a nitrogen compound of up to 40 carbon atoms of the group consisting of ammonia, primary aliphatic amines, secondary aliphatic amines, aliphatic diamines, aliphatic triamines, olefinic primary amines, olefinic secondary amines, aliphatic amino ethers, and mixtures thereof, said nitrogen compounds having a replaceable hydrogen atom attached to a nitrogen atom, at a temperature of about 0° C. to the reflux temperature of the reaction mixture and separating a solid resinous product.

2. The process in accordance with claim 1 in which said nitrogen compound is ammonia.

3. The process in accordance with claim 1 in which said nitrogen compound is a primary aliphatic amine.

4. The process in accordance with claim 1 in which said alkylene sulfate contains 2 to 22 carbon atoms and said nitrogen compound is ammonia.

5. The process in accordance with claim 4 in which said alkylene sulfate is ethylene sulfate.

6. The process in accordance with claim 4 in which said alkylene sulfate is propylene sulfate.

7. The process in accordance with claim 1 in which said nitrogen compound is a secondary aliphatic amine.

8. The process in accordance with claim 1 in which said alkylene sulfate contains 2 to 22 carbon atoms and said nitrogen compound is a secondary aliphatic amine.

9. The process in accordance with claim 8 in which said alkylene sulfate is ethylene sulfate and said secondary aliphatic amine is diethylamine.

10. The process in accordance with claim 1 in which said alkylene sulfate is formed in situ by reaction of the corresponding alkylene oxide with complexed sulfur trioxide.

11. The process in accordance with claim 10 in which said sulfur trioxide is complexed with a complexing agent of the group consisting of dioxane, thioxane and mixtures thereof.

12. The process of preparing resinous compositions which consists in reacting substantially equimolar amounts of an alkylene oxide of 2 to 102 carbon atoms containing only hydrogen, hydrocarbon and halo substitutents with sulfamic acid in an inert solvent at a temperature of about 0° C. to the reflux temperature of the reaction mixture and separating a solid resinous product.

13. The product produced by the reaction of substantially equimolar amounts of an alkylene oxide of 2 to 102 carbon atoms containing only hydrogen, hydrocarbon and halo substituents with sulfamic acid at a temperature of about 0° C. to the reflux temperature of said reactants.

14. The viscous, resinous product produced by the reaction of substantially equimolar amounts of ethylene oxide, and sulfur trioxide, followed by reaction with gaseous ammonia.

15. The viscous, resinous reaction product produced by the reaction of substantially equimolar amounts of ethylene oxide, and sulfur trioxide, followed by reaction with diethylamine.

16. The viscous, resinous reaction product produced by the reaction of substantially equimolar amounts of propylene oxide and sulfur trioxide, followed by reaction with gaseous ammonia.

17. The viscous, resinous reaction product produced by the reaction of substantially equimolar amounts of propylene oxide and sulfamic acid.

18. The viscous, resinous reaction product produced by the reaction of substantially equimolar amounts of dodecene oxide and sulfamic acid.

19. The viscous, resinous reaction product produced by the reaction of substantially equimolar amounts of 1,2-butylene oxide and sulfamic acid.

References Cited in the file of this patent

UNITED STATES PATENTS

| | | |
|---|---|---|
| 2,660,563 | Barnes et al. | Nov. 24, 1953 |
| 3,045,027 | Ham | July 27, 1962 |

FOREIGN PATENTS

| | | |
|---|---|---|
| 670,159 | Great Britain | Apr. 16, 1952 |